United States Patent Office 2,797,990
Patented July 2, 1957

2,797,990

FLUX FOR MAGNESIUM ALLOYS CONTAINING ZIRCONIUM

Allan Froats, Renfrew, Ontario, Canada, assignor to Dominion Magnesium Limited, Toronto, Ontario, Canada No Drawing. Application March 1, 1954,
Serial No. 413,431

Claims priority, application Canada March 12, 1953

2 Claims. (Cl. 75—94)

This invention relates to a flux for magnesium base alloys containing zirconium.

Much difficulty has been experienced by many workers in finding a flux which operates efficiently in the introduction of zirconium, with or without other metals, into magnesium in the production of magnesium base alloys, which are becoming more widely used for various purposes owing to their physical and mechanical properties.

In metallurgy, a flux performs an important function as a scavenging agent in the removal of impurities from the alloy or other metal under treatment. Thus it will be apparent that a flux, which, because of its chemical composition or physical properties, leaves residual impurities in the alloy or metal under treatment, is not desirable or efficient in the production of pure metal or alloys.

The difficulties heretofore experienced with known fluxes in the production of zirconium-containing magnesium alloys are attributable to one or both of two causes, i. e. (1) the mechanical inability of the flux and metal to segregate into sharply defined layers which allow of clean separation of the metal from the flux containing the impurities which it has absorbed, (2) mutual solubility of one or more of the flux components with the alloy metal.

The object of the present invention is to provide a flux, which will avoid incipient precipitation of the zirconium throughout the period of heat treatment in forming the desired alloy, and which has properties of surface tension and density such that particles of it will readily settle out of the melt.

It has been found that a flux composition containing substantially no chlorides except barium chloride and calcium chloride together with magnesium fluoride, which acts as a thickening agent, well serves the purpose. Equal parts of barium chloride and calcium chloride, providing a eutectic mixture which melts at 600° C., are preferred, but the proportions of each of the chlorides may vary between 45 to 55% with an optimum melting temperature not substantially exceeding 630° C. To such a mixture is added 15 to 35% by weight of the thickener magnesium fluoride to insure clean separation of the flux from the alloy. The mixed chlorides should be fused to avoid absorption of moisture and to insure complete removal of moisture from the flux ingredients. Also the fused mixture has a lower melting point than that of a mechanical mixture of the two chlorides. Moreover, calcium chloride prefused with barium chloride is less susceptible to moisture pickup than by itself. After the two chlorides are mixed, fused and crushed, the thickening agent is incorporated.

The properties of surface tension and density of the flux are such that particles of it will readily settle out of the melt removing any insoluble zirconium compounds. The absence of such particles in the melt constitutes improved conditions for holding zirconium in solution by avoiding the "seeding" of dissolved zirconium. Thus this flux accounts for as much as 7% increase in the soluble zirconium and decreases the amount of insoluble zirconium product present by an excess of 50% in comparison with the results obtained by using flux consisting of mixtures containing chlorides of alkali metals and alkaline earth metals with or without magnesium fluoride as a thickening agent.

It is well recognized that zirconium in dissolved form, rather than undissolved form, produces maximum beneficial mechanical properties in magnesium alloys containing zirconium and that the presence in such alloys of flux inclusions is detrimental.

The flux is useful for the introduction into magnesium of zirconium by itself as well as in conjunction with other metals such as zinc, cerium and the like.

What is claimed is:

1. A flux for introducing zirconium into magnesium in the production of magnesium base alloys which consists essentially of a fused mixture of barium chloride and calcium chloride within the proportions of 45 to 55% by weight of each, and having an optimum melting temperature not substantially exceeding 630° C., and 15 to 35% by weight of magnesium fluoride, said flux being substantially free from other chlorides.

2. A flux as defined in claim 1, wherein said proportions by weight of barium chloride and calcium chloride are substantially equal and said melting point of said fused mixture is substantially 600° C.

References Cited in the file of this patent

UNITED STATES PATENTS

| 2,497,540 | Emley | Feb. 14, 1950 |
| 2,552,106 | Miller et al. | May 8, 1951 |
| 2,620,310 | Albrecht | Dec. 2, 1952 |

OTHER REFERENCES

"Transactions of the American Society for Steel Treating," pages 248 and 249, November 1922.